No. 615,612. Patented Dec. 6, 1898.
F. DUNHAM.
BICYCLE SUPPORT.
(Application filed Apr. 12, 1897.)

(No Model.)

Witnesses.
Walter P. Camp.
Marion Richards.

Inventor.
Frederick Dunham.
by
Daniel Clifford.
his attorneys.

UNITED STATES PATENT OFFICE.

FREDERICK DUNHAM, OF DEERING, MAINE.

BICYCLE-SUPPORT.

SPECIFICATION forming part of Letters Patent No. 615,612, dated December 6, 1898.

Application filed April 12, 1897. Serial No. 631,714. (No model.)

*To all whom it may concern:*

Be it known that I, FREDERICK DUNHAM, a citizen of the United States of America, residing at Deering, in the county of Cumberland and State of Maine, have invented certain new and useful Improvements in Bicycle-Rests; and I do hereby declare the following to be a full, clear, and exact description of the invention, such as will enable others skilled in the art to which it appertains to make and use the same.

My invention relates to improvements in rests or supports for bicycles, and especially to that class of bicycle rests or supports which are portable and can be easily and readily attached to and detached from the pedal.

It consists of a continuous strip of elastic material, the middle portion of which is bent to form a suitably-extended base, the free ends of which are brought together and lightly contact, forming suitable spring-arms, which are adapted to be sprung over the axle upon which the pedal of the bicycle revolves or over the central bar of the pedal; and it consists in certain other details of construction, which will hereinafter be more fully described and set forth.

Figure 1:
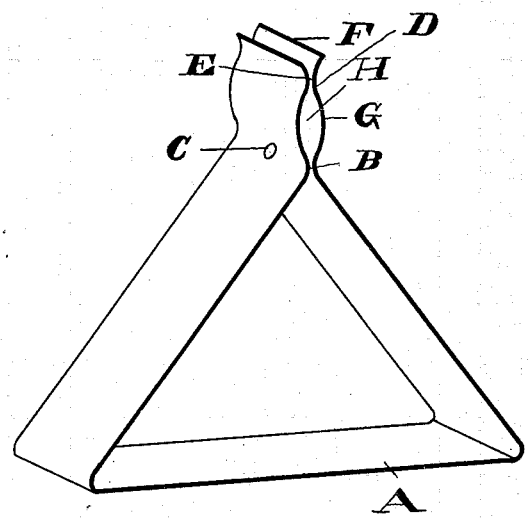
Figure 2:
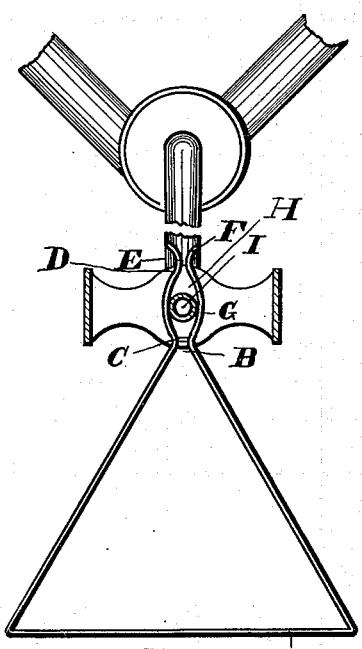

In the drawings herewith accompanying and forming a part of this application, Figure 1 is a perspective view of my improved device. Fig. 2 is a vertical section of the same, showing my improved device attached to the bicycle-pedal.

The same letters refer to like parts.

In said drawings, A represents the base of my improved device, formed by bending a continuous strip of elastic material at the middle thereof, forming thereby a suitably-extended portion, and which serves to allow the rest to stand when placed in position. The free ends of this strip are brought together, as at B, where they lightly contact, and are held from spreading too widely apart by means of a bolt or pin C. The free ends D of the base A lightly contact also at E and are made flaring, as shown at F. These flaring ends yield sufficiently to allow the pedal to be inserted within. Said free ends D at or above the pin C have substantially a concave form, as shown at G, so as to form a suitable socket H for the reception of the central bar or axle I of the pedal, as shown in Fig. 2. The free ends D are made flaring, as shown, for the further purpose of serving as a guide when the rest is being attached to the pedal. The purpose of the bolt C is to prevent the free ends D from springing too widely apart. If they were allowed to do this, the efficiency of the device would be severely impaired, for the reason that the weight of the bicycle when canted would force the pedal-axle through the arms, and thereby the device would not serve its intended purpose. This bolt does not prevent the free ends from springing sufficiently apart to admit of the insertion of the pedal.

The operation of my improved device is as follows: When it is desired to have the bicycle stand or when the rider desires to dismount and leave his wheel standing in the street or roadside, he forces the rest down upon the axle or central bar of the pedal, near the outer extremity thereof. The weight of the rest will cause the pedal to revolve until the rest hangs perpendicularly. It will then be necessary only to cant the bicycle slightly, so that the weight of the machine will be brought upon the rest. This will prevent the bicycle from falling to one side or the other and hold it securely in place.

The advantages of my improved device are that it is easily attached to or detached from the bicycle-pedal and can be easily carried either in a suitable receptacle on the bicycle or in the pocket of the rider.

Having thus described my invention and its use, I claim—

A support or rest for bicycles consisting of a continuous strip of elastic material, the middle portion bent to form a suitably-extended base and brought together at a common point near the ends and rigidly secured together at the point of contact in any convenient manner, the free ends above the point of contact curved to form a socket between them for the reception of the pedal and flaring mouth to guide the pedal into said socket, the jaws of said flaring mouth being adapted to yield to permit the insertion of the pedal and after insertion to contract to hold said pedal firmly, substantially as and for the purposes set forth.

In testimony whereof I affix my signature, in presence of two witnesses, this 10th day of April, A. D. 1897.

FREDERICK DUNHAM.

Witnesses:
ELGIN C. VERRILL,
NATHAN CLIFFORD.